United States Patent [19]

Krelis et al.

[11] 4,111,405

[45] Sep. 5, 1978

[54] SEAL BETWEEN WALL MEMBERS OF A METALLURGICAL VESSEL ENCLOSURE

[75] Inventors: Peter S. Krelis, Mt. Lebanon Township, Allegheny County; Larry M. Prox, Pittsburgh, both of Pa.

[73] Assignee: United States Steel Corporation, Pittsburgh, Pa.

[21] Appl. No.: 806,218

[22] Filed: Jun. 13, 1977

[51] Int. Cl.² .............................................. C21C 5/38
[52] U.S. Cl. ...................................... 266/158; 49/370; 49/481
[58] Field of Search ................... 49/366, 368, 370, 480, 49/481, 483; 110/1 E, 1 G, 173 R; 266/142, 143, 158, 264; 432/237

[56] References Cited

U.S. PATENT DOCUMENTS

| | | | |
|---|---|---|---|
| 1,867,010 | 7/1932 | Kampes | 49/483 |
| 2,107,762 | 2/1938 | Olds | 110/173 R |
| 2,933,783 | 4/1960 | Leto | 49/481 |
| 3,215,425 | 11/1965 | Vogt | 266/158 |
| 3,537,694 | 11/1970 | Rinesch et al. | 266/158 |
| 3,782,304 | 1/1974 | Balaz | 110/173 R |
| 3,938,788 | 2/1976 | Josten | 266/142 |
| 4,002,537 | 1/1977 | Calderon | 110/173 R |
| 4,049,246 | 9/1977 | Ziegler | 266/142 |
| 4,050,682 | 9/1977 | Baum | 266/158 |

*Primary Examiner*—Gerald A. Dost
*Attorney, Agent, or Firm*—William F. Riesmeyer, III

[57] ABSTRACT

Two elongated sealing members are provided to prevent escape of gases from between a movable wall member and an abutting wall member of a metallurgical vessel enclosure. A first elongated sealing member is mounted on the first of the wall members and has a compressible material facing the second of the wall members. A second elongated sealing member is mounted on the second of the wall members and has a blade facing the elongated receiving member. The elongated sealing members are located so that they make contact before the adjoining edges of the wall members are abutted. At least one of said elongated sealing members is movably mounted so that after the elongated sealing members make contact, the wall members may be moved to an abutting position with their adjoining edges touching so as to minimize the effect of heat on said elongated sealing members.

3 Claims, 8 Drawing Figures

SEAL BETWEEN WALL MEMBERS OF A METALLURGICAL VESSEL ENCLOSURE

BACKGROUND OF THE INVENTION

In the metals producing industries, a refining operation may be carried out by blowing gases into molten metal contained in a vessel. Impurities are removed by chemical reaction and go into a slag or are emitted in gaseous form from the vessel. A hood may be located over the mouth of the vessel to draw off the gases and conduct them to pollution control equipment. To further reduce escape of gases to the surrounding work area, an enclosure is sometimes erected so as to surround the vessel and confine the gases to an area where the hood effectively may remove them. Such an enclosure is commonly used in the steel industry to surround a BOP or Q-BOP metallurgical vessel.

The enclosure is generally constructed of two or more abutting wall members which are of heavy steel construction. One or more of the wall members is movable so that an opening may be created to expose the vessel and permit charging of materials therein. When the wall members are closed and the refining operation progresses, gases may escape from between a movable wall member and its abutting wall members unless a tight abutting fit is provided. In past practice, no special seal was provided to prevent this escape of gas; the seal depended upon a tightly abutted joint between adjoining edges of the abutting wall members. Due to the heavy steel construction of the wall members, heat radiated from the vessel causes warping along the adjoining edges of the wall members and prevents obtaining a tightly abutted joint. This effect becomes accentuated as operating time progresses which permits more gases to escape to the surrounding work area. Another factor is that the slag and molten metal splash from the vessel and collect on the adjoining edges of the wall members and further prevent a tightly abutted joint.

Applicant is not aware of any prior art showing a sealing means between a movable wall member of an enclosure for a metallurgical vessel and an abutting wall member. However, seals have been provided in metallurgical furnace structures such as heat treating furnaces and annealing furnaces where protective atmospheres are used.

A seal is shown in U.S. Pat. No. 2,354,127, Krauscope, between a movable floor or bottom of a heat treating furnace and the furnace walls. The movable floor has a trough around its periphery containing an asbestos gasket covered by a sheet metal strip. The asbestos gasket is supported on a plurality of spaced springs, each mounted over a rod mounted in the trough. A plate surface mounted on the bottom of the walls of the furnace contacts the sheet metal strip as the movable floor is closed and compresses the asbestos gasket. The sheet metal strip has V-notches in its sides to permit flexible bending when it contacts the plate surface of the walls. The asbestos gasket serves to fill in between the notches of the sheet metal strip as it flexes. This seal prevents gaps due to warping of the floor or walls of the furnace only to the degree that the sheet metal strip is flexible enough to follow the contour of the warped areas.

Another seal is shown in U.S. Pat. No. 3,179,394, Sims et al, between a base section and a cover for an annealing furnace. A flange extends vertically from a trough around the periphery of the base and contacts a resilient material mounted around the periphery of the cover. The weight of the cover presses the flange into the resilient material which is either solid or sponge rubber or neoprene, resilient plastic, etc. Since the cover becomes hot, cooling water is provided against a plate covering the back of the resilient material. A secondary seal is also provided on an outer periphery from the first seal. The resilient material is located in the cover so as to be protected from scale or other foreign materials which might prevent an effective seal. This seal is limited to locations between a base and a cover and does not teach use of a resilient material along a vertical edge of a wall member.

We have found that a heat resistant resilient material may be used for a seal along the vertical edge between two wall members and that cooling of said resilient material is not necessary. We have also found that such a seal may be maintained regardless of warping of the edges of the wall members and buildup of foreign materials along said edges.

SUMMARY OF THE INVENTION

In accordance with this invention, two elongated sealing members are provided to prevent escape of gases from between a movable wall member and an abutting wall member of a metallurgical vessel enclosure. A first elongated sealing member is mounted along the adjoining edge of the first of the wall members. The first elongated sealing member has a heat resistant compressible material with an exposed planar surface facing the second of the wall members. A second elongated sealing member is mounted along the adjoining edge of the second of the wall members. The second elongated sealing member has a blade with a leading edge of heat resistant material facing the exposed planar surface of the compressible material of the elongated receiving member. The compressible material of the elongated receiving member is located in a slightly retracted position with respect to the adjoining edge of the first of the wall members so as to be protected from the heat of the vessel. The blade of the second elongated receiving member protrudes substantially beyond the plane of the adjoining edge of the second of the wall members so as to contact the first elongated sealing member before the adjoining edges of the wall members come in contact. Means is provided for allowing at least one of the elongated sealing members to move with respect to the wall member on which it is mounted after the two elongated sealing members come in contact, so that the two wall members may be brought to a position with the adjoining edges in abutting contact. This closes most of the gap between the wall members and reduces the heat on the compressible material.

It is an object of this invention to provide sealing means for preventing escape of gases between adjoining edges of abutting wall members in an enclosure for a metallurgical vessel.

It is an object of this invention to provide two elongated sealing members which prevent escape of gases between abutting wall members of an enclosure for a metallurgical vessel where said members are warped and have buildup of foreign materials along their adjoining edges and are prevented from tightly abutting along said edges.

BRIEF DESCRIPTION OF THE DRAWINGS

FIG. I is a side elevation view of an enclosure for a metallurgical vessel.

FIG. II is a front elevation of an enclosure for a metallurgical vessel shown at the operating floor level.

Figure 1:
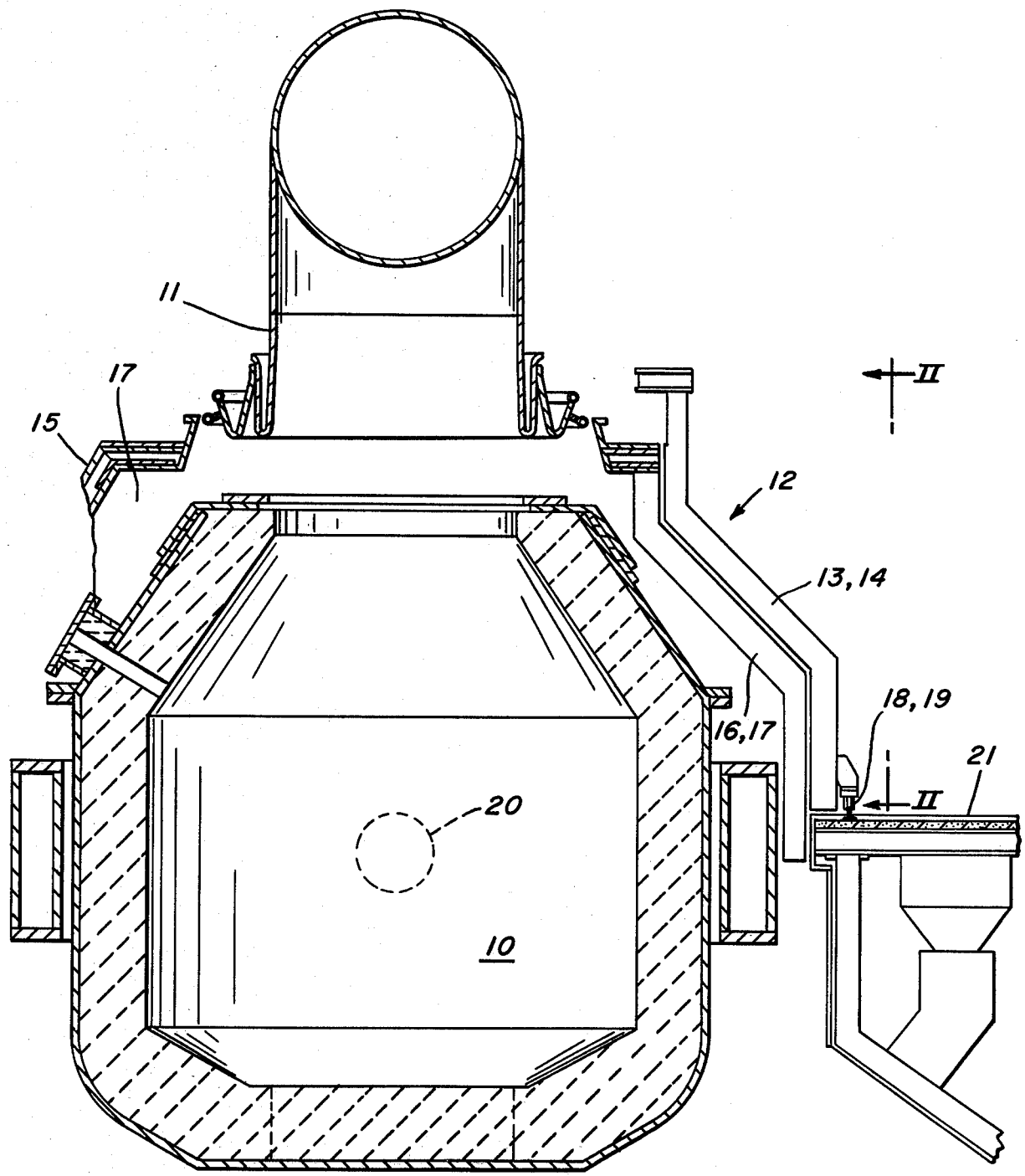
Figure 2:
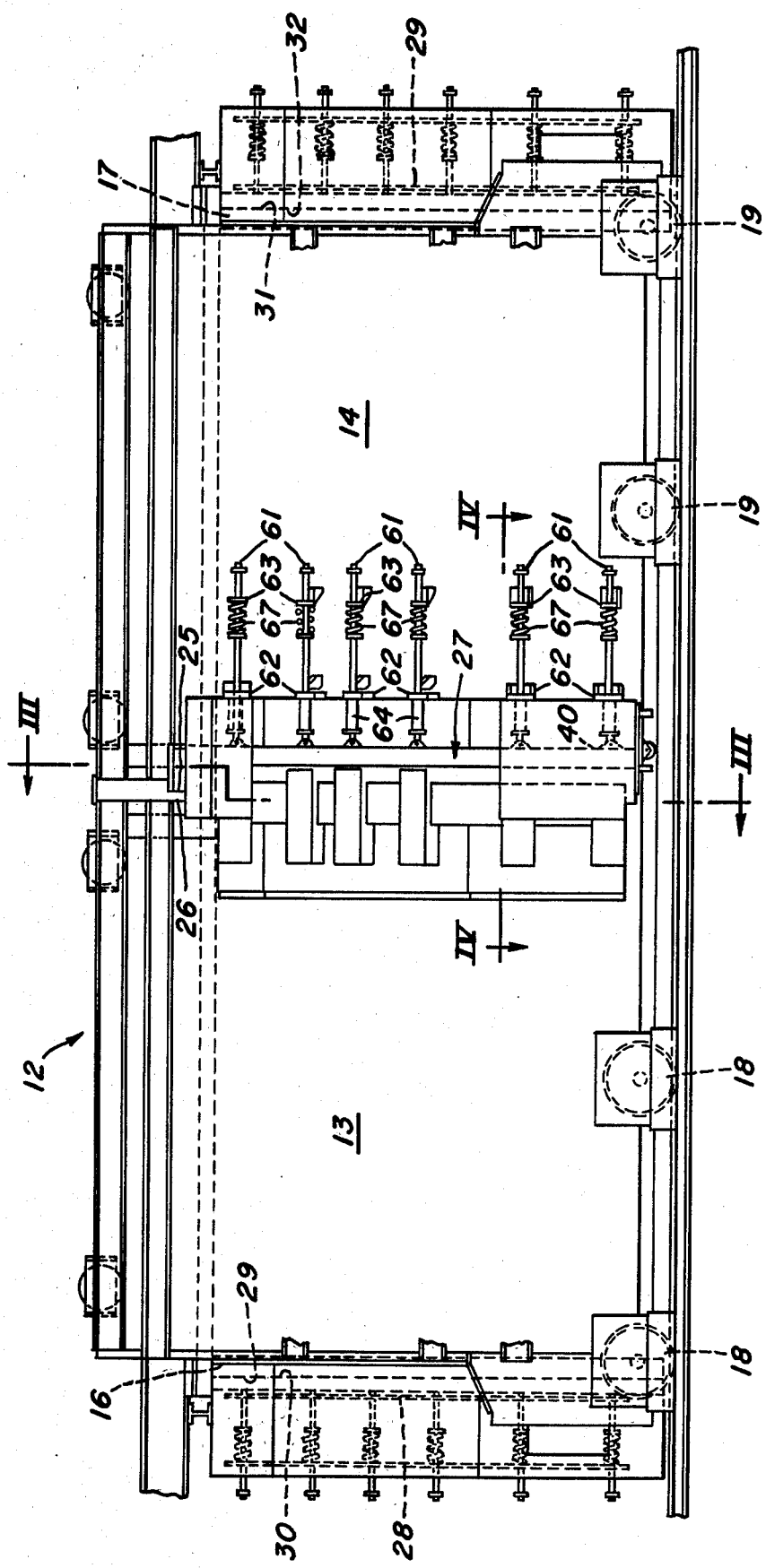
Figure 4:
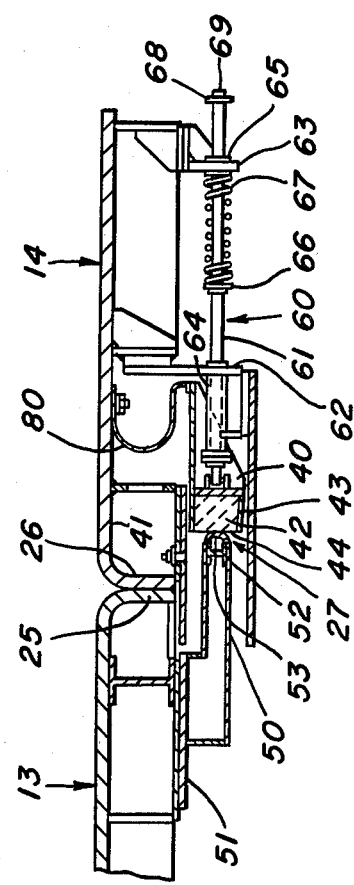
Figure 4A:
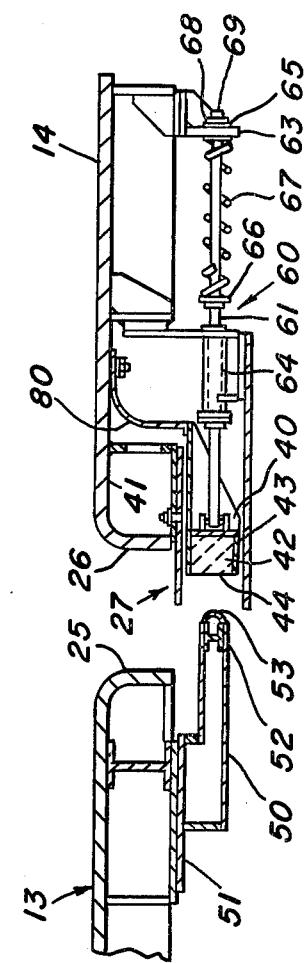
Figure 3:
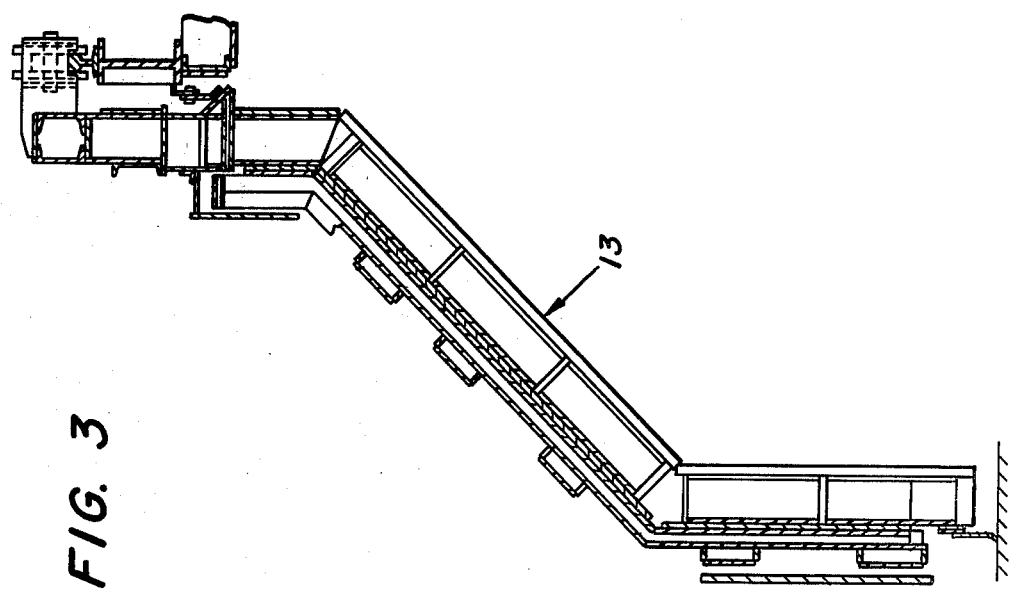
Figure 6:
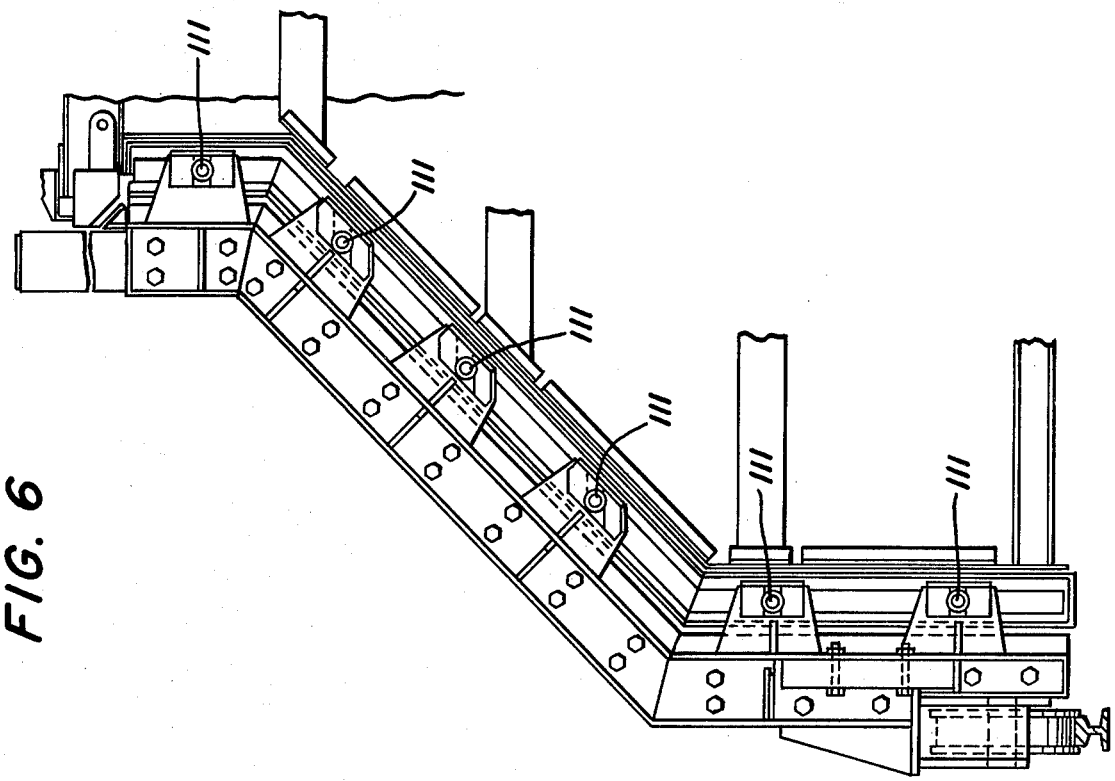
Figure 5:
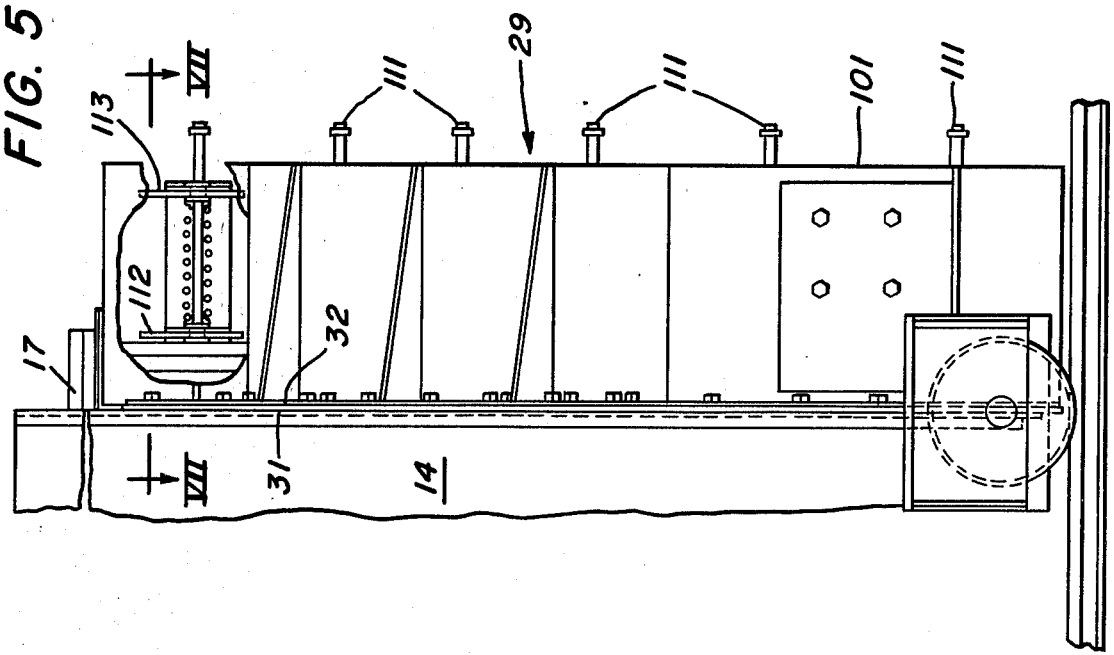
Figure 7:
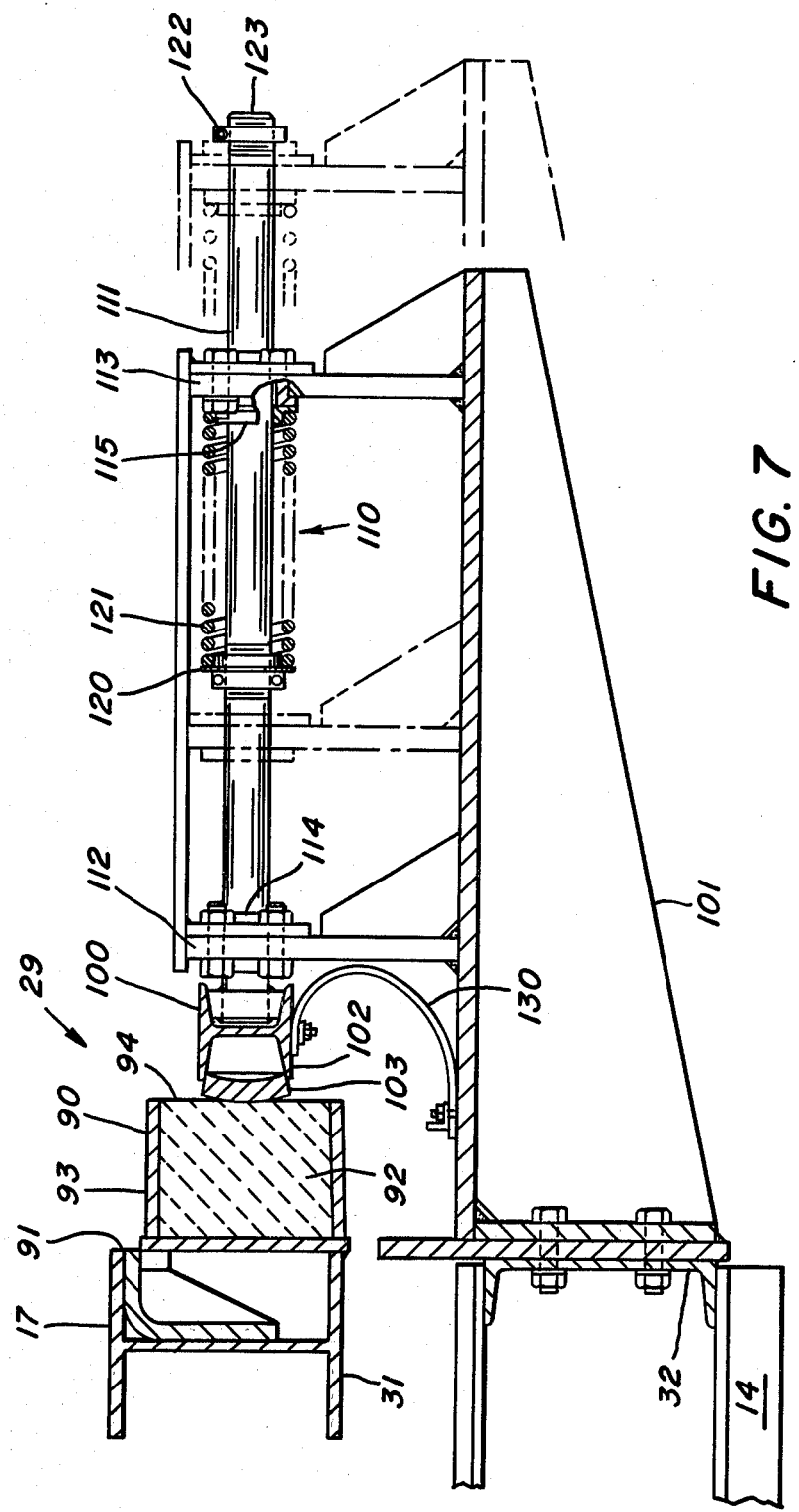

FIG. III is an end view of the front wall of the enclosure in FIG. II.

FIG. IV is a cross section taken at the line IV—IV of the sealing members between the front wall members of FIG. III.

FIG. IV-A is the same as FIG. IV except that the wall members are shown in an open position.

FIG. V is a front view in enlarged section of the sealing members between the right front wall member of FIG. III and the side wall member of the enclosure.

FIG. VI is an end view of the seal in FIG. V.

FIG. VII is a cross section taken at VII—VII of the sealing member of FIG. V.

DESCRIPTION OF THE PREFERRED EMBODIMENT

Refining of molten metal, such as for example in the refining of steel, may be carried out in a metallurgical vessel 10 shown in FIG. I. The refining operation entails blowing oxygen gas into the molten metal either through tuyeres in the bottom of vessel 10 or through a lance inserted in the mouth of the vessel 10. In either case, large volumes of gases containing various impurities are emitted from the mouth of vessel 10. Generally, a hood 11 is provided over the vessel mouth to draw off the impure gases and to conduct them to pollution control equipment. It is sometimes necessary to construct a metallurgical vessel enclosure 12 to more effectively contain the gases and prevent pollution of the surrounding work area. The enclosure 12 has two wall members 13, 14 shown in cross section in FIG. I and is a front elevation view in FIG. II. The enclosure 12 also has a wall member 15 forming the rear of the enclosure 12 and wall members 16, 17 forming sidewalls. Wall members 13, 14 form the entire front of the enclosure 12 in the embodiment shown and are slidably movable on wheels 18, 19 so that when in an open and parted position vessel 10 is exposed. Vessel 10 may be rotated on trunnions about axis 20 to place the vessel mouth near the operating floor 21 so that materials may be added.

The two wall members 13, 14 abut each other along adjoining edges 25, 26 and have sealing means 27 located therebetween to prevent escape of gases when wall members 13, 14 are in a closed position. Similarly, a sealing means 28 is located between adjoining edges 29, 30 of wall member 13 and abutting wall member 16, and a sealing means 29 is located between adjoining edges 31, 32 of wall member 14 and abutting wall member 17.

The two wall members 13, 14 have an irregular contour as shown in the end view of FIG. III. The sealing means 27 between the two wall members 13, 14 follows their irregular contour and has a first elongated sealing member 40 FIGS. II and IV mounted along the exterior face 41 of the first of the wall members 14, and along the adjoining edge 26. By exterior face, we mean either on an exterior surface facing away from the vessel toward the surrounding work area, or within the frame of a hollow wall member, but not on the interior face toward the vessel 10. The first elongated sealing member 40 has a compressible material 42, preferably of ceramic fiber blocks such as the aluminum-silica type sold under the trade name "Fiberfrax" by the Carborundum Company. The alumina-silica types will withstand temperatures up to 2300° F. Preferably, a low density block such as that having a density of 4 lbs./cubic foot is used since these have more compressibility. In installing the blocks, we compress them about 30% and wrap tape around them to hold them in compression as they are placed in metal trough 43 after installation, the tape is cut and the blocks expand against the sidewalls and back of the trough securing them in place. The compressible material 42 has an exposed planar surface 44 facing wall member 13. Compressible material 42 is coextensive in length with adjoining edges 25, 26 of wall members 13, 14 and is located in a slightly retracted position from the plane of adjoining edge 26 of wall member 14 so as to be protected from the heat of vessel 10 and splashing molten metal or slag from vessel 10.

Sealing means 27 also has a second elongated sealing member 50 mounted along the exterior face 51 of the second wall members 13 and along the adjoining edge 25. The second elongated sealing member 50 has a blade 52 with a leading edge 53 formed of a heat resistant material, preferably cast iron. The blade 52 is coextensive in length with adjoining edge 25, 26 of wall members 13, 14 (as shown in FIGS. III and IV), and is located so that the leading edge 53 of the blade 52 protrudes substantially beyond the plane of adjoining edge 25 of wall member 13 toward the first elongated sealing member 40 so as to make contact with the compressible material 42 of the first elongated sealing member 40 before the adjoining edges 25, 26 of wall members 13, 14 are brought into contact as they are being closed. Preferably contact is made while there is still a gap of up to six inches between adjoining edges 25, 26 to insure that a gas tight seal is formed. Thus, for purposes of this application, we refer to a seal being formed when the wall members are closed and intend to include positions from tightly abutted up to a position with a gap of about 6 inches between their adjoining edges. In practice, heat from the vessel 10 causes warping of the steel construction of wall members 13, 14 thus preventing tightly abutted joints between their adjoining edges 25, 26. Also, splashing slag or molten metal collect on adjoining edges 25, 26 aggravating the condition and preventing complete closure. Thus, it is necessary to have contact between the two elongated sealing members 40, 50 while there is a substantial gap between the adjoining edges in order to insure a gas tight seal in actual operation.

To minimize the penetration of heat from vessel 10 to the two elongated sealing members 40, 50 when the wall members 13, 14 are closed, means for allowing at least one of the elongated sealing members 40, 50 to move with respect to the wall member on which it is mounted is provided so that the wall member 13, 14 may be moved closer together after the two elongated sealing members are in contact, in order to bring the adjoining edges 25, 26 of the wall members 13, 14 into abutting contact.

Preferably said means 60 includes a plurality of rods 61 as shown in FIG. II spaced along the length of the first elongated sealing member 40. Each rod 61 is secured at one end to the elongated sealing member 40 and extends in a direction perpendicular to the longitudinal axis of said first elongated sealing member 40, as shown in FIGS. II, IV and IV-A. A plurality of pairs of spaced mounting brackets 62, 63 are provided, each of which is associated with one of the rods 61. Each first mounting bracket 62 is secured to wall member 14 and supports the end of rod 61 nearest the first elongated sealing member 40. Rod 61 rests in a tube guide 64 located in an opening in mounting bracket 62. The second mounting bracket 63 of each pair supports the end of rod 61 opposite the first elongated sealing member 40 and has a tube guide 65 in an opening for supporting said rod 61. A collar 66 is secured to rod 61 between mounting brackets 62, 63 and holds a coil spring 67 mounted over rod 61 between it and the second mounting bracket 63. A stop 68 is secured to the end 69 of rod 61 to prevent it from moving out of bracket 63. The coil spring 67 maintains a force against the first elongated sealing member 40 which causes it to maintain contact against the second elongated sealing member 50 and thereby preserve the gas tight seal.

In the preferred form, a flexible barrier 80, as shown in FIG. IV, and IV-A prevents escape of gas from between the movable parts of the movable mounting means 60. The flexible barrier may be composed of a heat resistant cloth such as made and sold by Hitco Division of Armco Steel Corporation under the trade name "Refrasil" supported between two sections of cablewarp cloth such as used in the paper industry and sold by W. S. Tyler Company. The flexible barrier 80 is coextensive in length with the first elongated sealing member 40 and is secured along its length at one end to the exterior face 41 of wall member 14, and at the other end to the metal casing 43 of the first elongated sealing member 40.

The sealing means 28 and 29 between a side wall member and a movable front wall member are similar so that only one will be described in detail. The sealing means 29 as shown in FIGS. II, V, VI and VII extends along the adjoining edges 31, 32 (FIGS. VI and VII) of wall member 14 and wall member 17. Sealing means 29 has a first elongated sealing member 90 mounted on the exterior face 91 and along the adjoining edge 31 of side wall member 17. The first elongated sealing member 90 has a compressible material 92, which is the same as that previously described and held in metal casing 93, with an exposed planar surface 94 facing a second elongated sealing member 100. It is apparent that since side wall member 17 and movable wall member 14 are orthogonal to each other and since wall member 14 is slidably movable in its plane that the exposed planar surface 94 of compressible material 92 must face in a direction perpendicular to the plane of side wall member 17 toward the exterior of the enclosure 12.

Sealing means 29 has a second elongated sealing member 100 mounted along the adjoining edge of movable wall member 14. An extension plate 101 is secured to the adjoining edge 32 of wall member 14 to provide a mounting for aligning the blade 102 of said second elongated sealing member 100 toward the exposed planar surface 94 of the first elongated sealing member 90. The leading edge 103 of the blade 102 may be composed of a heat resistant material such as cast iron. The blade 102 is located so that its leading edge 103 makes contact with the compressible material 92 before the movable wall member is in a completely closed position; that is, abutted against wall member 13. This is necessary since wall members 13, 14 may be prevented from being completely closed due to buildup of slag or other materials along their adjoining edges 25, 26 and thus preventing complete closure of wall member 14 along adjoining edge 32 with adjoining edge 31 of wall member 17.

In order to permit movable wall member 14 to move to an abutting closed position with wall member 13 after the seal 29 is formed, at least one of the two elongated sealing members is movably mounted. In the embodiment shown in FIGS. V, VI and VII, the second elongated sealing member 100 has a means 110 for allowing it to move with respect to wall member 14.

Preferably said means 110 includes a plurality of rods 111 spaced along the length of the second elongated sealing member 100 as shown in FIGS. II, V, and VI. Each rod 111 is secured at one end to the blade 102 of the second elongated sealing member 100 and extends in a direction perpendicular to the longitudinal axis of the second elongated sealing member 102 as shown in FIG. VII. A plurality of pairs of spaced mounting brackets 112, 113 are provided, each of which is associated with one of the rods 111. The first mounting bracket 112 of each pair is secured to extension plate 101 and supports the end of rod 111 nearest the blade 102. The second mounting bracket 113 of each pair supports the end of rod 111 opposite from blade 102. Each first mounting bracket 112 has a tube guide 114 in an opening of the bracket for supporting the rod 111 and permits free movement of the rod 111 therethrough. Similarly, the second mounting bracket 113 of each pair has a tube guide 115 in an opening of the bracket for supporting rod 111 and permits free movement of said rod 111 therethrough. A collar 120 is secured to each rod 111 between each pair of mounting brackets 112, 113 and holds a coil spring 121 mounted over rod 111 between it and the second mounting bracket 113. A stop 122 is secured to the end 123 of rod 111 to prevent it from moving out of bracket 113. The coil spring maintains a force against the blade 102 causing it to continually press into the compressible material 92 and thereby maintain a gas tight seal.

Again in the preferred form, a flexible barrier 130 as shown in FIG. VII and the same as previously described prevents escape of gas from between clearances allowed for the moving parts of the movable mounting means 110.

We claim:

1. In a metallurgical vessel enclosure having two horizontally slidable wall members each, abutting the other along a generally vertical adjoining edge at one end, and abutting another wall member along a second generally vertical edge at an opposite end, the improvement which comprises:

a first elongated sealing member mounted along the exterior face of the edge of the first of the slidable wall members which adjoins the second slidable wall member, said first sealing member having a heat resistant compressible material with an exposed planar surface facing the second of said slidable wall members, the compressible material of said first elongated sealing member being located so that its exposed planar surface is in a slightly retracted position from the edge of the first slidable wall member so as to be protected from heat and molten materials splashing from the vessel, a second elongated sealing member mounted along the edge of the second slidable wall member adjoining the first, said second sealing member having a blade with a leading edge formed of a heat resistant material, said second elongated sealing member being located so that the leading edge of the blade substantially protrudes beyond the plane of the adjoining edge of the second slidable wall member toward the first elongated sealing member so as to make contact therewith before the adjoining edges of said first and second slidable wall members are brought into abutting contact, and means for allowing the first of said elongated sealing members to move so that after the elongated sealing members are in contact, the two slidable wall members may be moved to an abutting position simultaneously displacing said first elongated sealing member further from the adjoining edges of the slidable wall members thus minimizing penetration of heat and splashing molten metal or slag to said sealing members.

2. The apparatus of claim 1, wherein said means comprises a plurality of rods spaced along the length of the first elongated sealing member extending along the exterior of said first slidable wall member and being mounted thereon, and a coil spring mounted on each rod for urging said first elongated sealing member against the second elongated sealing member so as to form a gas tight seal along the full length of said elongated sealing members.

3. The apparatus of claim 1 further comprising a first elongated sealing member of heat resistant compressible material mounted along the edge of the exterior face of each wall member adjoining the opposite ends of the first and second slidable wall members, said compressible material with an exposed planar surface facing the direction of backward movement of the adjoining slidable wall member, a second elongated sealing member with a heat resistant blade mounted on the interior face of each of the slidable wall members at their opposite ends facing the exposed planar surface of the first elongated sealing member, said blade being positioned so as to contact the first elongated sealing member before the slidable wall members are abutted, and means for allowing movement of the blade as the slidable wall members are abutted but resisting said movement so as to urge said blade into the heat resistant compressible material to form a gas fight seal.

* * * * *